United States Patent [19]

Goussin et al.

[11] Patent Number: 5,089,667
[45] Date of Patent: Feb. 18, 1992

[54] BASEBOARD, ARCHITECTURAL MOLDING OR THE LIKE FOR ACCOMMODATING AND PROTECTING ELECTRICAL EQUIPMENT AND ELECTRICAL CONDUCTORS CONNECTED THERETO

[75] Inventors: Vincent Goussin, Bais; Nathalie Lajat, La Milesse, both of France

[73] Assignee: Legrand, Limoges, France

[21] Appl. No.: 475,949

[22] Filed: Feb. 6, 1990

[30] Foreign Application Priority Data

Feb. 7, 1989 [FR] France .................. 89 01534

[51] Int. Cl.⁵ .................................. H02G 3/04
[52] U.S. Cl. ................... 174/101; 138/117; 174/97; 174/68.3
[58] Field of Search .............. 174/68.3, 97, 101; 138/115, 116, 117

[56] References Cited

U.S. PATENT DOCUMENTS

| | | | |
|---|---|---|---|
| 4,627,469 | 12/1986 | Buard | 174/101 X |
| 4,990,722 | 2/1991 | Navazo | 174/97 |

FOREIGN PATENT DOCUMENTS

| | | | |
|---|---|---|---|
| 2018139 | 2/1972 | Fed. Rep. of Germany | 174/97 |
| 3113679 | 10/1982 | Fed. Rep. of Germany | 174/68.3 |
| 3633604 | 6/1987 | Fed. Rep. of Germany | 174/97 |
| 2473226 | 7/1981 | France | 174/97 |
| 8100793 | 3/1981 | PCT Int'l Appl. | 174/97 |
| 1131125 | 10/1968 | United Kingdom | 174/68.3 |
| 2174254 | 10/1986 | United Kingdom | 174/97 |

*Primary Examiner*—Morris H. Nimmo
*Attorney, Agent, or Firm*—Longacre & White

[57] ABSTRACT

A molding, baseboard or the like for accommodating equipment such as electrical equipment and, in this case, electrical wiring for such electrical equipment, comprises a generally U-shape main part having a back and two side flanges and a separate cover adapted to extend between the free edges of the flanges. At least one longitudinal rib projects from the back of this main part for selective attachment of accessories thereto. At least one removable partition for optional use has a foot adapted to be attached to the rib or one of the ribs and there is also provided at least one set of at least two part-covers for use when one or more partitions are used. Each part-cover is adapted to extend between one side flange of the main part and the removable partition when one partition is used or between two removable partitions when two or more are used. The side flanges each comprise a snap-fastener member adapted to cooperate with a complementary snap-fastener member on the cover or part-cover. The partition, or each partition, comprises at its longitudinal edge opposite its foot two back-to-back snap-fastener members of the same kind as the snap-fastener members on the side flanges.

22 Claims, 1 Drawing Sheet

U.S. Patent
Feb. 18, 1992
5,089,667
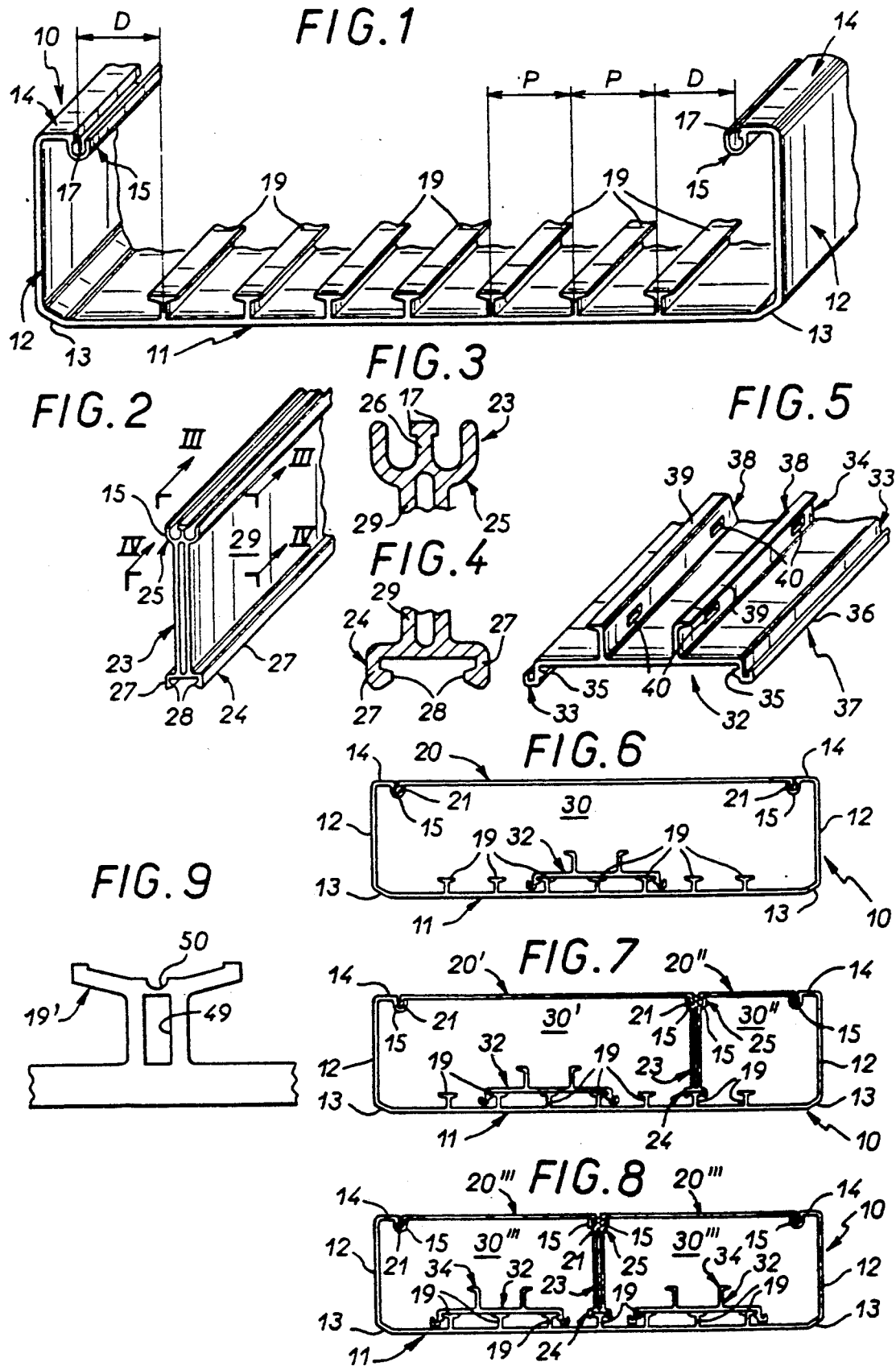

BASEBOARD, ARCHITECTURAL MOLDING OR THE LIKE FOR ACCOMMODATING AND PROTECTING ELECTRICAL EQUIPMENT AND ELECTRICAL CONDUCTORS CONNECTED THERETO

BACKGROUND OF THE INVENTION

1. Field of the Invention

The present invention concerns baseboards, architectural moldings or the like (hereinafter referred to as "moldings") used to accommodate and protect equipment and in particular electrical equipment and electrical conductors connected thereto, especially when such equipment is to be attached to a wall or any other kind of supporting surface.

2. Description of the Prior Art

These moldings are generally extruded from plastics material or metal and comprise a generally U-shape main part with a back and two side flanges and a separate cover adapted to extend transversely from the free edge of one flange of the main part to the free edge of the other flange.

At least one longitudinal rib usually projects from the back of the main part of such moldings so that accessories may be attached thereto, for example lugs for attaching the equipment concerned or boxes adapted to accommodate such equipment.

These ribs can also constitute rails, for example rails complying with the EN 500 35 or EN 500 22 standard, adapted to support the equipment directly, the latter being snap-fastened to them.

The normal construction is such that these ribs extend all along the length of the main part of the molding comprising them.

In some moldings it is usual to provide longitudinal partitions projecting from the back to subdivide the interior of the main part in order, for example, to separate high-current equipment from low-current equipment.

At present such partitions are usually rigidly attached to the back of the molding, being in one piece therewith, As a result, the subdivision of the interior space of the main part of such moldings into compartments is fixed once and for all, with no possibility of modification and therefore of adaptation to new requirements.

There is usually associated with a molding of this kind at present a single cover extending in one piece from one side flange to the other.

A particular result of this is that removing the cover to obtain access to one of the internal compartments of the molding also gives unnecessary access to the other internal compartments thereof, to the detriment of safety.

The document FR-A No. 2,473,226 describes removable partitions adapted to be attached by means of a "foot" to a rib on the back of the molding. Their "heads" are adapted to be attached together transversely by so-called "part covers" which in reality are no more than simple crossmembers adapted to locate the partitions, the whole being capped in the usual way by a cover.

In any event, the nesting means provided on the removable partitions for cooperation with the "sub-covers" are of a different kind from those provided on the side flanges of the molding concerned to cooperate with the cover, and in practise they are of the opposite configuration from these.

In other words, in this document FR-A No. 2,473,226 the cover is not able to cooperate nesting fashion with the removable partitions used.

What is more, the "sub-covers" associated with the latter are all identical, which limits the possible configurations in which the removable partitions can be fitted.

A general object of the present invention is a molding which does not have this disadvantage and which has other advantages.

SUMMARY OF THE INVENTION

The present invention consists in a molding comprising a generally U-shape cross-section main part having a back and two side flanges, at least one longitudinal rib projecting from the back of the main part for selective attachment of accessories thereto, at least one removable partition for optional use having a foot adapted to be attached to the at least one rib, a separate, cover adapted to extend between free edges of the flanges when no removable partition is used and at least one set of at least two part-covers each adapted to extend between one side flange of the main part and the at least one removable partition or between two removable partitions if two or more partitions are used, the side flanges each comprising snap-fastener members adapted to cooperate with complementary snap-fastener members on the cover or part-covers and the at least one partition comprising at its longitudinal edge opposite the foot two back-to-back snap-fastener members of the same kind as the snap-fastener members on said side flanges.

The removable partition is fitted only when needed and the two compartments that it delimits may then each have an individual part-cover, so that it is possible to obtain access to one of them without necessarily obtaining access to the other.

The back of the molding preferably has projecting from it several identical parallel ribs and these ribs are advantageously equally spaced.

In this way various configurations are feasible by fitting one or more removable partitions which gives the molding in accordance with the invention the advantage of considerable flexibility of adaptation to specific utilisation conditions.

When the main part comprises a plurality of longitudinal ribs projecting from its back, the molding is preferably associated with at least one plate having legs whereby it is adapted to be attached to two of the ribs and which is adapted to carry a rail adapted to support equipment, said rail being either in one piece with the plate or separate from the plate and appropriately attached thereto.

Rather than extending along the entire length of the main part of the molding, the plate and the rail that it carries may advantageously be localized, where it is necessary to install an item of equipment.

This has the advantage of saving in materials.

It also has the advantage of saving space to the benefit of installing the necessary electrical conductors, for example.

If required, the flanges of the rail may comprise perforations at intervals for passing through them any kind of cable tie for tying the corresponding electrical conductors into bundles.

As will be readily understood, it is much easier to form such perforations when the rail is carried by a separate plate than when it is carried directly by the back of the molding concerned, the side flanges of the molding then lying on either side of it and inevitably impeding use of the corresponding tool.

The arrangements are preferably such that however the plate is installed the rail that it carries is centred relative to the corresponding cover or part-cover.

In this way the equipment carried by the rail is itself centered relative to the cover or part-cover, improving the overall esthetic appearance of the installation.

Characteristics and advantages of the invention will emerge from the following description given by way of example only and with reference to the appended diagrammatic drawings.

BRIEF DESCRIPTION OF THE DRAWINGS

FIG. 1 is a partial perspective view of the main part of a molding in accordance with the invention.

FIG. 2 is a partial view in perspective of a removable partition associated with the molding.

FIGS. 3 and 4 are partial views of the removable partition to a larger scale and in transverse cross-section on the respective lines III—III and IV—IV in FIG. 2.

FIG. 5 is a partial perspective view of a plate and rail also associated with the molding in accordance with the invention.

FIG. 6 is an end view of a molding in accordance with the invention in a first configuration.

FIGS. 7 and 8 are end views analogous to that of FIG. 6 for two other possible configurations of the molding in accordance with the invention.

FIG. 9 is an end view of a preferred embodiment of rib.

DETAILED DESCRIPTION OF THE INVENTION

As shown in the figures, the molding in accordance with the invention comprises a main part 10 with a generally U-shape transverse cross-section having a back 11 and two side flanges 12.

The side flanges 12 are generally perpendicular to the back 11 and each is joined to the latter by an inclined facet 13 extending obliquely from the side flange 12 to the back 11. Each has a right-angle return 14 at its free edge. These returns are therefore parallel to the back 11 and extend towards each other. The free edge of this return is shaped to constitute a snap-fastener member 15.

The snap-fastener member 15 comprises a channel whose outlet has a transverse width less than that of its main part, a projection 17 being provided to partially close the outlet from the channel on the side nearer the side flange concerned.

Longitudinal ribs 19 adapted to attach accessories to the back 11 project from the latter.

The identical ribs 19 are parallel and regularly spaced at an interval or spacing P.

The ribs have a T-shape transverse profile.

For reasons that will emerge later, the number of ribs 19 is preferably odd and the outermost ribs 19 are each at a distance D from the free edge of the corresponding side flange 12 (as materially represented by the median plane or center line of the snap-fastener member 15 that the latter forms) which, measured in the transverse direction, is equal to the internal or spacing P of the ribs 19.

In the embodiment shown there are seven ribs 19.

Associated with the main part 10 of the molding in the usual way are cover means.

As shown in FIG. 6, these cover means may comprise a single cover 20 adapted to extend in one piece from one side flange 12 to the other.

For the purpose of snap-fastening it to the main part 10 the cover 20 is provided along each edge with a snap-fastener member 21 complementary to the snap-fastener member 15 provided along the corresponding free edge of each of the side flanges of the main part 10.

This member comprises a bead inserted into the channel constituting a snap-fastener member 15 by virtue of elastic deformation thereof.

The corresponding arrangements are well known in themselves and as they do not of themselves constitute any part of the present invention they will not be described in more detail here.

Also in a way that is known in itself, there is associated with the main part 10 of the molding at least one removable partition 23 for optional use which has a foot 24 by means of which it is adapted to be attached snap-fastener fashion to a rib 19.

There is further associated with the main part 10 of the molding, constituting cover means that can be substituted as required for the single cover 20, at least one set of at least two part-covers 20', 20" each adapted to extend from one of the side flanges 12 of the main part 10 to the head 25 of said removable partition 23 when one partition is used or from the head 25 of one removable partition 23 to that of another removable partition 23 when more than one partition are used.

The head 25 of the removable partition 23 comprises two back-to-back longitudinal snap-fastener members 15 each adapted to cooperate snap-fastener fashion with a complementary snap-fastener member 21 provided for this purpose on each of the part-covers 20', 20". They are of the same kind as that provided on each of the side flanges 12 of the main part 10.

Each of these snap-fastener members 15 is therefore a channel whose outlet has a transverse width less than that of its main part, this outlet being partially closed by a projection 17.

The projections 17 of the snap-fastener members 15 are disposed back-to-back on a median wall 26 common to both the channels.

The foot 24 of the removable partition 23 is formed with two parallel legs 27 with beads 28 projecting towards each other at their free edges.

Between its foot 24 and its head 25 the removable partition 23 constitutes a simple flange 29.

This flange 29 is hollow and the median wall 26 of the head 25 is aligned with the corresponding opening As will be readily understood, the removable partition 23 can also be extruded.

As shown in FIG. 7, its foot 24 is adapted to be snap-fastened to any of the ribs 19 on the main part 10 of the molding, here to one of the ribs 19 adjacent an outermost rib 19.

Because these ribs are T-shaped, it does not matter which way round the partition is fitted.

Its height is such that the snap-fastener members 15 at its head 25 are level with the snap-fastener members 15 on the side flanges 12 of the main part 10.

When fitted as shown here, the removable partition 23 divides the interior space of the main part 10 into two unequal size compartments 30', 30".

This is preferably the case over the entire length of the main part 10, either because the removable partition 23 is the same length as the latter or because a plurality of shorter removable partitions 23 are fitted end-to-end for this purpose.

The appropriately sized part-covers 20', 20" then advantageously close the respective individual compartments 30', 30" delimited within the main part 10.

On one side the part-covers 20', 20" are engaged with the snap-fastener member 15 on the corresponding side flange 12 of the main part 10; on the other side they are engaged with the corresponding snap-fastener member 15 on the removable partition 23.

It follows from what has been explained already that the part-covers 20', 20" are of different widths, the sum of their widths substantially corresponding to the width of the previous cover 20.

Alternatively, as shown in FIG. 8, a different set of two part-covers 20''' that are the same width can be used, the two members being identical. The removable partition 23 is in this case fitted to the central rib 19 on the main part 10, so dividing the interior space of the latter into two same-size compartments 30'''.

Of course, other configurations are possible for fitting the removable partition 23 and therefore for the respective widths of the part-covers to be used.

Given the number of ribs 19 on the back 11 of the main part 10, consideration may even be given to fitting two or more removable partitions 23, the set of part-covers then comprising several part-covers 20" and possibly a part-cover 20'''.

For example, to divide the interior space of the main part 10 into three compartments using two removable partitions 23 a set of three part-covers is used, namely two part-covers 20" and one part-cover 20''' (not shown).

Alternatively, to divide this interior space into four same-size compartments, three removable partitions 23 are used in conjunction with a set of four part-covers 20''' (not shown).

In such cases at least one of the part-covers 20", 20''' used extends from the head 25 of one removable partition 23 to that of another removable partition 23.

To summarise, there may be associated with the main part 10 of the molding in accordance with the invention at least two sets of at least two different part-covers, that is to say at least two different sets of two different or identical part-covers.

All these part-covers are provided with snap-fastener members of the same kind along their edges.

Each of these various part-covers may serve as a single cover for a molding of corresponding width.

An accessory that may optionally be associated with the main part 10 of the molding comprises at least one plate 32 with legs 33 by which it is adapted to be attached to two ribs 19 on the back 11 of the main part 10 and which is adapted to carry a rail 34 adapted to serve as an equipment support, for example to support any kind of electrical equipment (not shown).

To cooperate snap-fastener fashion with the ribs 19 on the main part 10 the legs 33 of the plate 32 have on their inside surfaces beads 35 projecting towards each other.

At the free edges of their outside surface they have a U-shape return 36 to stiffen them. The shape of the legs 33 is such that the plate 13 can easily be removed using a simple tool such as a screwdriver.

The plate 32 is preferably of sufficient width to span an odd number of ribs 19.

In the embodiment shown here this number is three.

This number is preferably less than half the total number of ribs 19 to allow various possible positions of the plate 32 on the ribs 19.

The rail 34 carried by the plate 32 is in this instance in one piece (37) with the plate 32 and its legs 33.

In a way that is known in itself, the rail 34 comprises two parallel flanges 38 for snap-fastener retention of any kind of equipment.

The flanges 38 are parallel to the legs 33 of the plate 32, in the median area of the latter.

The flanges are the same height and have at their free edges right-angle returns 39 facing away from each other, thereby constituting a rail complying with the EN 500 22 standard.

The flanges 38 each comprise spaced perforations 40.

Despite the perforations 40, the member 37 is also an extrusion.

It may be the same length as the main part 10.

It can be a different length to this, however, for example being cut to length as required from a longer member.

Be this as it may, the arrangements are preferably such that however the plate 32 is fitted to the ribs 19 on the main part 10, the rail 34 that it carries is centred relative to the corresponding part-cover 20, 20', 20" or 20'''.

This is the case in the embodiment shown by virtue of the arrangement of the ribs 19 relative to the edges of the side flanges 12 of the main part 10, by virtue of the odd number of ribs 19 and by virtue of the smaller odd number of ribs 19 that the plate 32 is adapted to span.

If a single cover 20 is used, for example, the plate 32 is fitted to the center three ribs 19 of the main part 10, as shown in FIG. 6.

Any equipment carried by its rail 34 is then correctly centred relative to the cover 20.

If, as shown in FIG. 7, the removable partition 23 subdivides the interior space of the main part 10 into two different-size compartments 30', 30", an odd number of ribs 19 remains in the larger of the compartments 30', 30" (the compartment 30' in the diagram) and the plate 32 is then fitted to the central three ribs 19 in the compartment 30' so that, as previously, any equipment carried by its rail 34 is centred relative to the corresponding part-cover 20'.

If, as in FIG. 8, the removable partition 23 divides the interior space of the main part 10 into two same-size compartments 30''' there remains an odd number of ribs 19 in each of the compartments 30''', three ribs in this instance. As a result, if a plate 32 is fitted to these ribs 19, any equipment attached to the rail 34 carried by the plate 32 is, as previously, centred relative to the part-cover 20'''.

As will be readily understood, and as previously mentioned, the perforations 40 in the plate 32 can be used to fit any kind of cable tie for attaching thereto the electrical conductors connected to the equipment in question.

In the embodiment shown the perforations 40 are rectangular.

They could be any other shape, of course.

As will be readily understood, the inclined facet 13 at the base of each of the side flanges 12 of the main part 10 advantageously constitutes a "hollow joint" adapted to absorb, to the advantageous benefit of esthetic appearance, the possibly irregular cut edge of any form of cladding applied to the side flange 12.

FIG. 9 shows a preferred embodiment of the ribs 19: these are "hollow" ribs 19' with a twin wall over their full height forming a space 49, in the same way as the removable partitions 23. At the top is a wall extending to either side of a recess 50 aligned with said space 49. As explained in U.S. Pat. No. 4,627,469, the ribs 19' can be used to nail or screw the main part 10 to any kind of support.

The present invention is not limited to the embodiments that have been described and shown, but encompasses any variant execution thereof.

In particular, the configuration of the side flanges of the main part of the molding, whether it comprises a right-angle return or not, is immaterial and the same goes for the gender (male or female) of the snap-fastener member with which the lateral flanges are provided to enable snap-fastening thereto of any kind of cover, and also to the number and/or specific configuration of the ribs carried by the back of the main part of the molding.

Similarly, the kind of rail carried by a plate adapted to be attached to an immaterial number of the previous ribs is immaterial, and for example the rail may equally well be of the unequal-size flange type covered by the EN 500 35 standard.

It may be advantageous to adopt for the foot 24 of the removable partitions 23 a profile similar to that of the legs 33 of the plate 32, so as to facilitate their detachment by means of a tool.

The usual accessories, such as ordinary separating partitions, may also be fitted to the ribs 19 or 19' or to the rail 34.

The various component parts of the molding in accordance with the invention may advantageously be made from a man-made material or from metal, for example by extrusion.

There is claimed:

1. A molding unit comprising a generally U-shape cross-section main part having a back wall and two opposed side flanges, identical parallel longitudinal ribs projecting form said back wall selectively cooperable with an accessory, at least one removable partition having foot means and head means for supporting the at least one removable partition with the molding unit, said foot means being selectively cooperable with the parallel ribs for attachment to a selected one of said ribs, said side flanges having free edges, snap-fastener members being provided on said side flanges adjacent said free edges, said at least one removable partition having back-to-back snap-fastener members adjacent said head means, said first mentioned and back-to-back snap-fastener members being of the same configuration, part covers having cooperable snap-fastener members cooperable with respective ones of the first-mentioned snap-fastener members on said side flanges and said back-to-back snap-fastener members on said at least one removable partition, said part covers being coplanar with each other in their operative position, with said cooperable and said first mentioned and back-to-back snap-fastener members in engagement with one other, whereby said at least one removable partition and said part covers define with said U-shape main part individually accessible plural compartments.

2. A molding unit according to claim 1, wherein said back-to-back snap-fastener members on said at least one removable partition have define outwardly opening channels, the transverse dimension of said channels being narrower at an outlet zone than inwardly thereof.

3. A molding unit according to claim 1, wherein said parallel ribs are T-shape in transverse cross-section.

4. A molding unit according to claim 3, wherein said parallel ribs are of hollow construction.

5. A molding unit according to claim 1, wherein said parallel ribs are equidistant from one another.

6. A molding unit according to claim 1, further comprising a plate member having legs selectively engageable with respective ribs for removably mounting said plate member thereon, said plate member having a rail directed away from said respective ribs for supporting an apparatus.

7. A molding unit according to claim 6, wherein said plate member, said legs and said rail are of one-piece construction.

8. A molding unit according to claim 6, wherein said rail is centered relative to a selected one of said cover parts.

9. A molding unit according to claim 6, wherein there are provided an odd number plurality of said ribs, said plate member is adapted to span an odd number of ribs less than half the total number of said ribs, the distance between the free edges of said side flanges and a center line of an adjacent outermost rib is equal to the spacing between adjacent ones of said ribs.

10. A molding unit according to claim 1, wherein an obliquely inclined facet joins each of said side flanges to said back wall so as to define beveled corners.

11. A molding unit comprising a generally U-shape cross-section main part having a back wall and two opposed side flanges, identical parallel longitudinal ribs projecting from said back wall selectively cooperable with an accessory, at least one removable partition having foot means and head means for supporting the at least one removable portion with the molding unit, said foot means being selectively cooperable with the parallel ribs for attachment to a selected one of said ribs, said side flanges having free edges, snap-fastener members being provided on said side flanges adjacent said free edges, a main cover having complementary snap fastener members cooperable with the first-mentioned snap-fastener members, said at least one removable partition having back-to-back snap fastener members adjacent said head means, a set of part covers having cooperable snap-fastener members cooperable with respective ones of the first-mentioned snap-fastener members on said side flanges and said back-to-back snap-fastener members on said at least one removable partition, whereby said main cover selectively defined with said U-shape main part a single compartment, and said at least one removable partition and said set of part covers together selectively define with said U-shape main part individually accessible plural compartments.

12. A molding unit according to claim 11, wherein said main cover and part covers having substantially planar walls, said planar walls lying in the same plane when in selective engagement with respective ones of the first-mentioned snap-fastener and said at least one removable partition.

13. A molding unit according to claim 11, wherein said back-to-back snap-fastener members on said at least one removable partition define outwardly opening channels, the transverse dimension of said channels being narrower at an outlet zone than inwardly thereof.

14. A molding unit according to claim 11, wherein said parallel ribs are T-shape in transverse cross-section.

15. A molding unit according to claim 11, wherein said parallel ribs are of hollow construction.

16. A molding unit according to claim 11, wherein said parallel ribs are equidistant form one another.

17. A molding unit according to claim 11, further comprising a plate member having legs selectively engageable with respective ribs for removably mounting said plate member thereon, said plate member having a rail directed away from said respective ribs for supporting apparatus.

18. A molding unit according to claim 17, wherein said plate, member, said legs and said rail are of one-piece construction.

19. A molding unit according to claim 17, wherein said rail is centered relative to a selected one of said main cover and part covers.

20. A molding unit according to claim 17, wherein there are provided an odd number plurality of said ribs, said plate member is adapted to span an odd number of ribs less than half the total number of said plural ribs, the distance between the free edges of said side flanges and a center line of an adjacent outermost rib is equal to the spacing between adjacent ones of said parallel ribs.

21. A molding unit according to claim 11, wherein an obliquely inclined facet joins each of said side flanges to said back wall so as to define respective beveled corners.

22. A molding unit comprising a generally U-shape cross-section main part having a back wall and two opposed side flanges, identical parallel longitudinal ribs projecting form said back wall selectively cooperable with an accessory, at least one removable partition having foot means and head means for supporting the at least one removable partition with the molding unit, said foot means being selectively cooperable with the parallel ribs for attachment to a selected one of said ribs, said side flanges having free edges, snap-fastener members being provided on said side flanges adjacent said free edges, said at leas one removable partition having back-to-back snap-fastener members adjacent said head means, the first-mentioned and back-to-back snap-fastener members being of the same configuration, part covers cooperable with respective ones of said snap-fastener members on said side flanges and said back-to-back snap-fastener members on said at least one removable partition, a plate member having legs selectively engageable with respective ones of said parallel ribs for removably mounting said plate member thereon, said plate member having a rail directed away from said respective ones of said parallel ribs for supporting an apparatus, an odd number plurality of said ribs being provided, said plate member being adapted to span an odd number of ribs less than half the total number of said parallel ribs, the distance between the free edges of said side flanges and a center line of an adjacent, outermost rib being equal to the spacing between adjacent ones of said parallel ribs.

* * * * *